United States Patent [19]

Matsumoto et al.

[11] 4,248,333
[45] Feb. 3, 1981

[54] VEHICLE TRANSMISSION WITH AN AUTOMATIC CLUTCH

[75] Inventors: Toshinori Matsumoto, Yokohama; Tamio Kawamoto, Sagamihara, both of Japan

[73] Assignee: Nissan Motor Company, Limited, Japan

[21] Appl. No.: 784,857

[22] Filed: Apr. 5, 1977

[30] Foreign Application Priority Data

Apr. 7, 1976 [JP] Japan .................................. 51/38213

[51] Int. Cl.² ............................................. F16D 47/00
[52] U.S. Cl. .............................. 192/0.052; 192/0.092; 192/3.59; 192/0.033
[58] Field of Search ............... 192/0.052, 0.032, 0.033, 192/0.092, 91 R, 3.59

[56] References Cited

U.S. PATENT DOCUMENTS

| | | | |
|---|---|---|---|
| 2,181,743 | 11/1939 | Sanford | 192/0.075 |
| 2,391,192 | 12/1945 | Price | 192/0.052 |
| 2,688,388 | 9/1954 | Gill, Jr. | 192/0.052 |
| 2,763,347 | 9/1956 | Haubordin et al. | 192/0.052 |
| 3,273,679 | 9/1966 | Uher | 192/0.052 |
| 3,379,291 | 4/1968 | Randol | 192/0.052 |
| 4,061,217 | 12/1977 | Toyota et al. | 192/0.052 |

FOREIGN PATENT DOCUMENTS 559985 9/1932 Fed. Rep. of Germany.
953135 11/1956 Fed. Rep. of Germany.
403185 12/1933 United Kingdom.

Primary Examiner—James F. Coan
Attorney, Agent, or Firm—Robert E. Burns; Emmanuel J. Lobato; Bruce L. Adams

[57] ABSTRACT

A vehicle transmission with an automatic clutch is disclosed in which for gear shifting the clutch is disengaged with the assistance of a vacuum of a source of vacuum, via a control valve having a solenoid actuated clutch release valve and a clutch servo. Disengagement of the clutch is carried out when a gear shift lever is manipulated with an engine accelerator released. Reengagement of the clutch when the vehicle is in motion commences as soon as the gear shift lever is released and/or the accelerator is depressed. A safeguard is provided so that reengagement of the clutch when the vehicle is at a standstill will not commence as long as the gear shift lever is touched.

2 Claims, 3 Drawing Figures

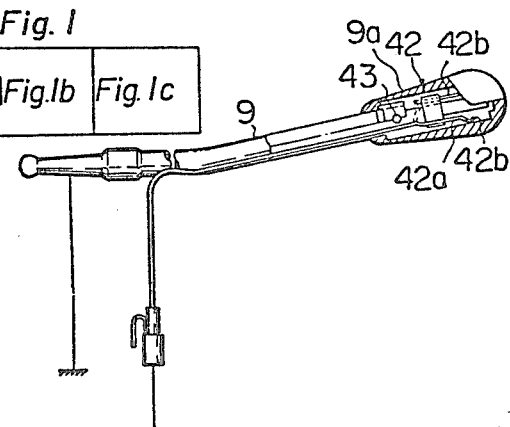
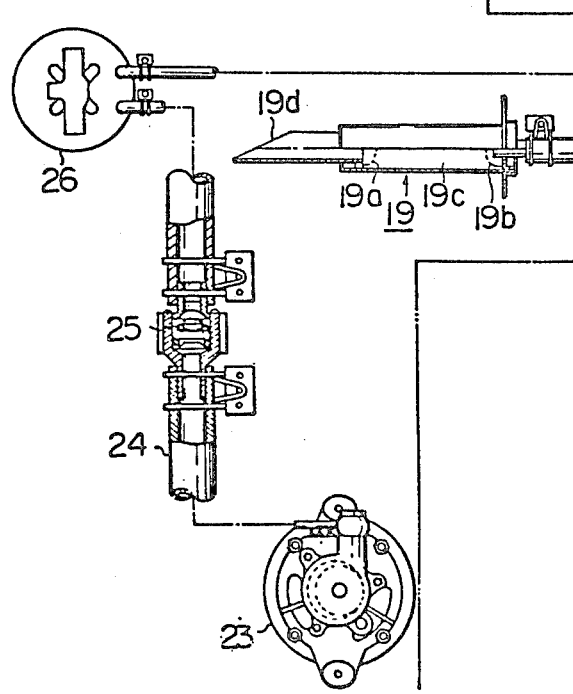
Fig. 1
| Fig.1a | Fig.1b | Fig.1c |
Fig.1a

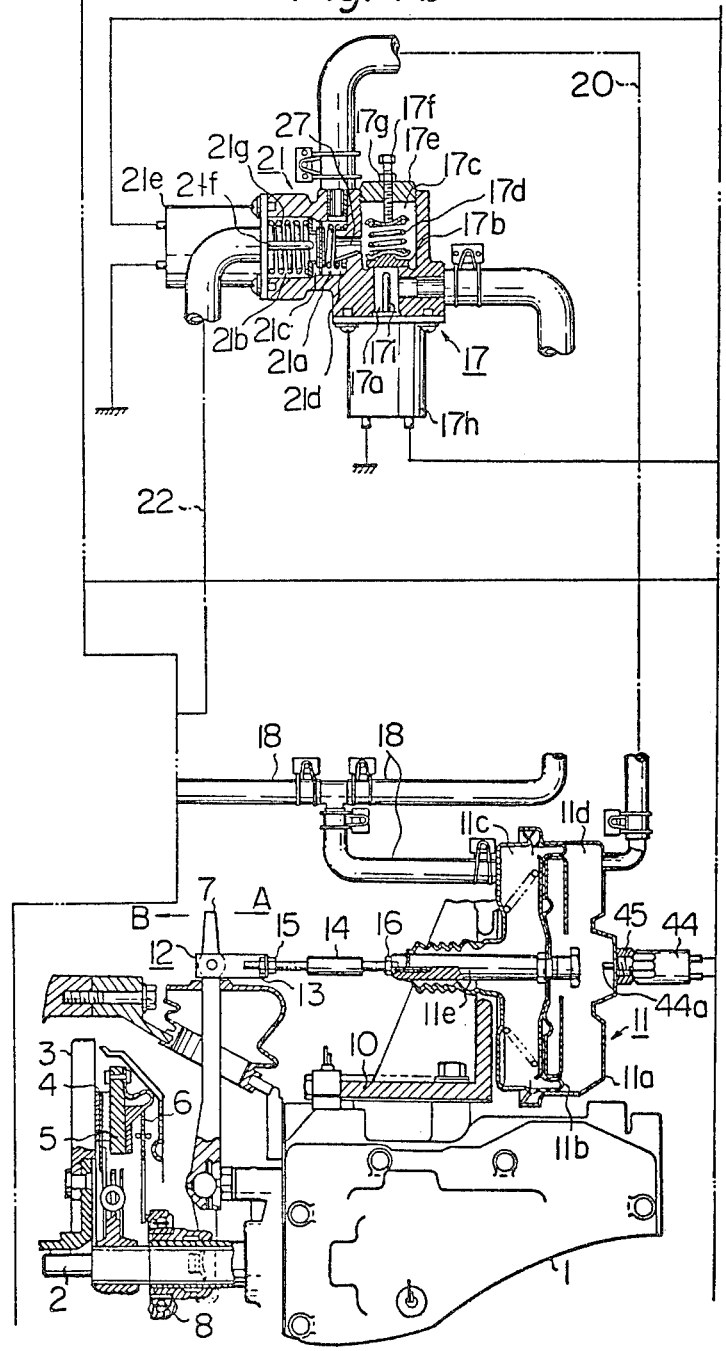

VEHICLE TRANSMISSION WITH AN AUTOMATIC CLUTCH

BACKGROUND OF THE INVENTION

The present invention relates to a vehicle transmission with an automatic clutch, and more particularly to means for controlling reengagement of a clutch.

A vehicle transmission with an automatic clutch is known in which for gear shifting a clutch is disengaged with the assistance of a vacuum of a source of vacuum, via a control valve having a solenoid actuated clutch release valve and a clutch servo. The solenoid actuated clutch release valve connects the clutch servo to the source of vacuum when a solenoid thereof is energized to disengage the clutch. A current is supplied to the solenoid when a shift switch and an acceleration switch are closed, the shift switch being closed only when a gear shift lever of a gear box is manipulated to shift gears, the acceleration switch being closed only when an engine accelerator is released. The reengagement of the clutch commences upon opening of the accelerator switch when the accelerator is depressed and/or upon opening of the shift switch when the gear shift lever is released.

Because, in this control arrangement, the reengagement of the clutch commences as soon as a driver depresses the accelerator, despite that the he still manipulates the gear shift lever, there is a drawback that when the vehicle is at a standstill, if a driver happens to depress the accelerator to open the acceleration switch before the gear is not yet completely engaged and when the shift switch remains closed, the reengagement of the clutch is carried out to connect an engine crankshaft to a gear box drive shaft so that the gears are very noisily ground together as soon as the gear shift lever is moved further to a position to complete gear engagement in the gear box and in some cases the gear engagement is hampered.

Another drawback is that when the vehicle is at a standstill, if the driver does not wish to move the vehicle from its present stationary position and thus still holds the gear shift lever to keep the shift switch closed, accidental depressing of the accelerator will cause the vehicle to move off regardless of the driver's intention.

SUMMARY OF THE INVENTION

It is therefore an object of the present invention to eliminate the above described drawbacks and to provide a vehicle transmission with a safeguard against accidental reengagement of a clutch when the vehicle is at a standstill.

It is another object of the present invention to provide a vehicle transmission having a clutch control arrangement whereby reengagement of a clutch when the vehicle is in motion commences as soon as a gear box gear shift lever is released and/or an engine accelerator is depressed, while the reengagement of the clutch when the vehicle is at a standstill will not commence as long as the gear shift lever is manipulated.

It is still another object of the present invention to provide a vehicle transmission in which the reengagement of the clutch is controlled by means of a two stage vacuum reduction after the gear has been shifted.

It is still another object of the present invention to provide a vehicle transmission in which a vacuum is supplied to a clutch servo to disengage the clutch, while upon the reengagement of the clutch, the reduction of the vacuum in the clutch servo takes place in two stages, in the first stage, the vacuum is reduced very quickly by means of an air-on valve until the clutch begins to engage, in the second stage, the residual vacuum is dissipated gradually till full engagement.

It is still another object of the present invention to provide a vehicle transmission in which the degree of vacuum to be reduced in the first stage regulated by the air-on valve is constant irrespective of operating conditions of the vehicle.

It is still another object of the present invention to provide a vehicle transmission in which the residual vacuum in the second stage is dissipated gradually by means of an accelerator actuated valve and a vehicle speed responsive valve so that, after a while, the clutch is fully engaged.

It is still another object of the present invention to provide a vehicle transmission in which the reduction of the vacuum in the second stage is speeded up in connection with the depression of the accelerator.

It is still another object of the present invention to provide a vehicle transmission in which when the vehicle is at a standstill, the reduction of the vacuum in the second stage will not commence if the gear shift lever is released as long as the accelerator remains released.

A vehicle transmission according to the present invention comprises a clutch normally urged by a clutch spring to a fully engaged condition to connect a gear box to an internal combustion engine, in which the clutch is disengaged with the assistance of a vacuum of a source of vacuum, via a control valve having a solenoid actuated clutch release valve and a clutch servo when a series circuit comprising a shift switch and an acceleration switch is completed. The completion of the series circuit takes place when a gear shift lever is manipulated and an accelerator is released. The acceleration switch is bypassed by a vehicle speed responsive switch which is closed to disable the acceleration switch only when the vehicle speed is lower than a predetermined speed value. Therefore, accidental reengagement of the clutch when the vehicle is at a standstill is prevented as long as the gear shift lever is manipulated.

Another feature is that the control valve has a solenoid actuated air-on valve fluidly disposed in air bleed fluid network means intermediate the clutch release valve and the atmosphere.

Still another feature of the present invention is that an accelerator actuated (air bleed) valve is fluidly connected in parallel with the air-on valve to bypass a bleed air around the air-on valve. The accelerator actuated valve regulates the reduction of the vacuum, in the second stage of the vacuum reduction upon the reengagement of the clutch, in connection with the depression of the accelerator.

Still another object of the present invention is that a solenoid actuated vehicle speed responsive valve is fluidly connected in parallel with the air-on valve to bypass a bleed air around the air-on valve. The vehicle speed responsive valve closes a flow restrictor, through which the bleed air flows, when the vehicle speed responsive switch is closed, and opens the flow restrictor when the vehicle speed responsive switch is open.

Still another feature of the present invention is that since the accelerator actuated valve is closed when the accelerator is released, the reduction of the vacuum in the second stage when the vehicle is at a standstill will not commence if the gear shift lever is released as long as the accelerator remains closed.

BRIEF DESCRIPTION OF THE DRAWINGS

FIGS. 1a, 1b and 1c each illustrate a portion of the invention. FIG. 1 illustrates how FIGS. 1a, 1b and 1c are joined to form the complete the invention.

DETAILED DESCRIPTION OF THE INVENTION

Figure 1C:
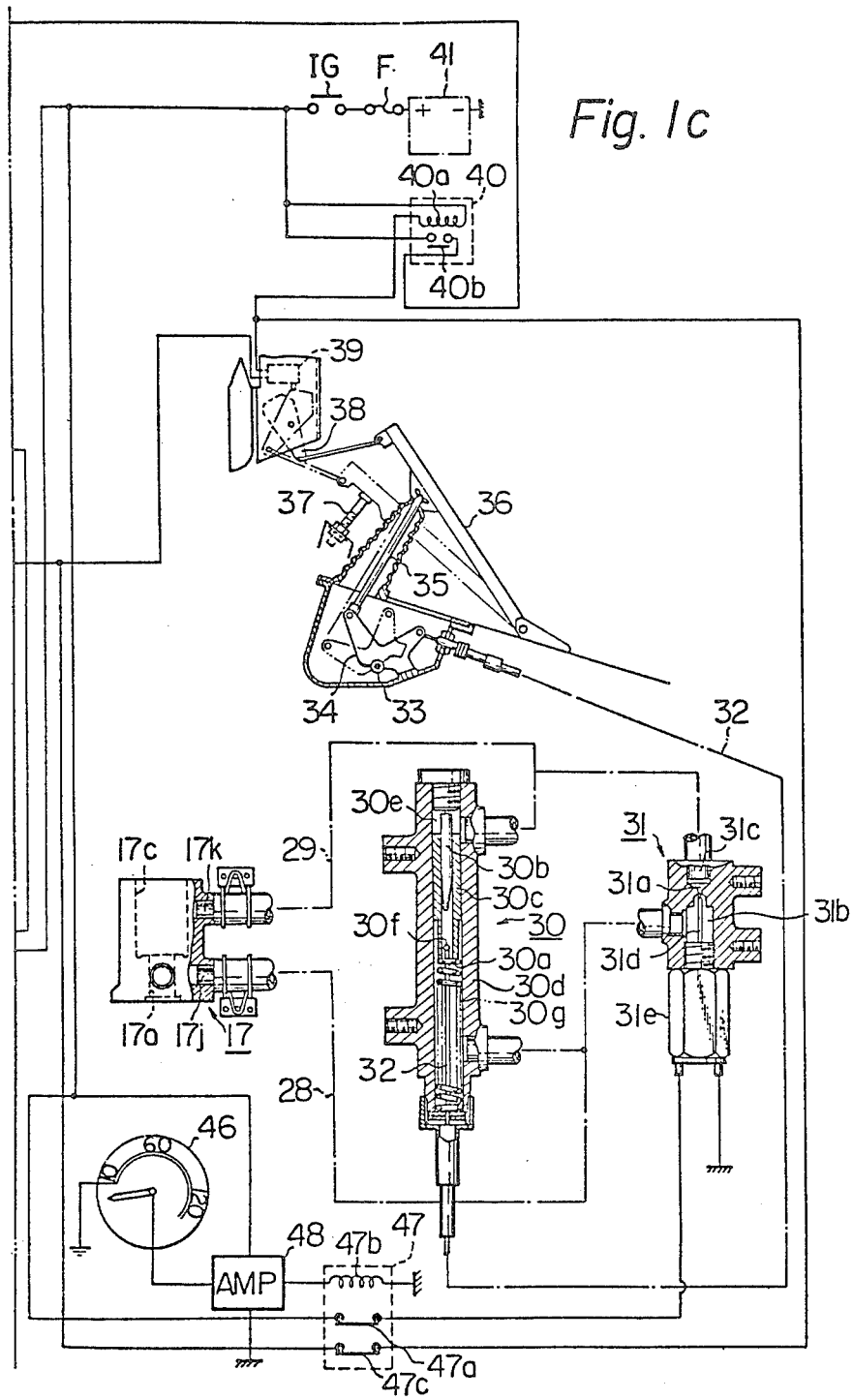

A vehicle transmission according to the invention shown generally comprises a clutch, a control valve and an electrical control arrangement.

Clutch

The clutch is provided in a power line of the vehicle transmission to connect an input shaft 2 of a gear box 1 to or disconnect the input shaft 2 from an engine crankshaft, not shown, and comprises a clutch disc having friction pads on both sides thereof and secured to a clutch hub splined to the input shaft 2. The clutch disc 4 is axially movable and disposed between a back up plate, in the form of a flywheel 3, driven by the engine crankshaft and a pressure plate 5. The pressure plate 5 is actuated by a single diaphragm spring of disc form 6. When the clutch is engaged, the diaphragm spring 6, of conical form, is flattened to provide the clamping pressure on the clutch disc 4. When disengaging the clutch, a withdrawl lever 7, which is provided on a ball secured to the housing of the gear box 1, operates through a release bearing 8 direct on to the central portion of the diaphragm spring 6. Near the outer portion of the diaphragm spring 6 a fulcrum is provided so that pressure on the diaphragm spring 6 at the center, toward the flywheel 3, forces the pressure plate 5 away from the flywheel 3 and thus frees the friction plate 4 from the engine drive. The illustrated positions of the parts of the clutch show the clutch in its engaged condition so that rotating the withdrawal lever 7 clockwise as viewed will disengage the clutch. When the clutch is disengaged gears can be shifted by a gear shift lever 9 in the normal manner. The clutch is actuated by a clutch servo (clutch actuator) 11 via the withdrawal lever 7.

Clutch Servo

The clutch actuator 11 is mounted on a bracket 10 which is secured to the gear box 1. The clutch actuator 11 comprises a shell 11a and a diaphragm 11b mounted in the shell 11a with its outer peripheral portion securely clamped between two bell shaped housings, which form the shell 11a, to divide the interior of the shell 11a into two chambers 11c and 11d. Mounted securely to the central portion of the diaphragm is an actuator rod 11e. The actuator rod 11e projects outwardly of the shell 11a, via the chamber 11c, and is operatively linked with the withdrawal lever 7 through an adjusting rod 14.

The adjusting rod 14 is formed with a left hand screw at one end and a right hand screw at an opposite end, and has its one end threadedly received in a tapped hole formed in a clevis 12, which rotatably supports a free end of the withdrawal lever 7 and has its opposite end threadedly received in a tapped hole formed in a projecting end of the actuator rod 11e. Denoted by 15 is a lock nut formed integral with the clevis 12 and denoted by 16 is another lock nut. Adjustment is effected by rotating the adjusting rod 14.

The chamber 11c of the clutch actuator 11 communicates at all times with the atmosphere, while the chamber 11d is connected to or disconnected from a source of vacuum under the control a control valve.

A compression spring is disposed in the chamber 11c of the clutch actuator 11 to balance with the diaphragm spring 6 of the clutch to assist the actuator rod 11e in moving toward the chamber 11d upon building up of a vacuum in the chamber lid.

Silencer

The chamber 11c of the clutch actuator 11 is connected to the atmosphere through conduit means 18 via a silencer 19.

The silencer 19 comprises a tubular casing having its both ends closed with meshes 19a and 19b. A filter element 19c, such as an element of an urethane, fills the interior of the tubular casing between the meshes 19a and 19b so as to eliminate noise due to air entering into the conduit means 18 and so as to clean the air. The silencer 19 has its inlet port 19d projecting from the tubular casing inclined to prevent a whistling noise.

The control valve comprises a solenoid actuated clutch release valve 21 and a solenoid actuated air-on valve 17.

Clutch Release Valve

The clutch release valve 21 has an output chamber 21a from which a conduit 20 leads to the chamber 11d of the clutch actuator 11 and an input chamber 21d to which a conduit 22 leads from a vacuum tank 26. A vacuum pump 23, driven by the engine, is connected to the vacuum tank 26 by a conduit 24 via a check valve 25. Alternatively, the engine manifold vacuum may be used, as a source of vacuum, by connecting the input chamber 21b to the engine manifold (not shown) via a check valve. Preferably, a vacuum tank is provided between the check valve and the input chamber 21b.

The clutch release valve 21 comprises a valve member 21c cooperable with a valve seat positioned between the input and output chambers 21b and 21a, a valve spring 21d disposed in the output chamber 21a to bias the valve member toward the valve seat, and a distance spring 21g disposed in the input chamber 21b to hold the valve seat. The output chamber 21a communicates with a chamber 17c of the air-on valve 17 by a connecting passage 27.

A solenoid 21e is installed with its actuating plunger 21f disposed in the input chamber 21b and directed toward the valve member 21c. When the solenoid 21e is not energized, the plunger 21f is in the illustrated position to cause the valve member 21c to seat on the valve seat to close communication between the input and output chambers 21b and 21a. In this position of the valve member 21c, the chamber 11d is disconnected from the vacuum tank 26, but is connected to the chamber 17c of the air-on valve 17 via the connecting passage 27. When the solenoid 21e is energized, the plunger 21f moves to the right, as viewed, toward the valve member 21c to urge the valve member 21c, against the bias action of the valve spring 21d, away from the valve seat toward the connecting passage 27 to close the same. In this position of the valve member 21c, the chamber 11d of the clutch actuator 11 is connected to the vacuum tank 26, but is disconnected from the chamber 17c of the air-on valve 17.

Air-on Valve

The air-on valve 17 comprises an atmosphere chamber 17a which is open to the atmosphere via the conduit means 18. The chambers 17a and 17c are connectable under the control of a valve member 17b. The valve member 17b is biased toward a closed position to close communication between the chambers 17a and 17c by a valve spring 17d.

One end of the valve spring 17d acts on the valve member 17b and an opposite end thereof seats on a valve retainer held by a screw 17f threadedly engaging a screw cap 17e which closes the chamber 17c. A lock nut 17g threadedly engages the screw 17f. Turning the screw 17f will reduce or increase biasing force on the valve member 17b.

A solenoid 17h is installed with its actuating plunger 17i in the chamber 17a and directed toward the valve member 17b. When the solenoid 17h is not energized, the plunger 17i is in the illustrated position to cause the valve member 17b to close communication between the chambers 17a and 17c. When the solenoid 17h is energized, the plunger 17i moves upwardly, as viewed, to urge the valve member 17b, against the action of the valve spring 17d toward an open position to open free communication between the chambers 17a and 17c. In the open position of the valve member 17b, the chamber 17c communicates with the atmosphere without any flow restriction.

Accelerator Actuated Valve

The accelerator actuated valve 30 controls a bleed air flowing from the chamber 17a to the chamber 17c bypassing the valve member 17b of the air-on valve 17 and is connected to a port 17j, opening to the chamber 17a, by conduit means 28 and to a port 17k, opening to the chamber 17c, by conduit means 29.

The accelerator actuated valve 30 comprises a housing 30a having a bore therethrough. One end of the bore is closed by an end plug screwed into the bore. From the end plug a needle 30b extends into the bore. The needle 30b has it pointed free end portion positioned in a hollow of a sleeve 30c slidably received in the bore of the housing 30a. A valve spring 30g is mounted in the bore between an end plug closing the opposite end of the bore and the sleeve 30c to bias the sleeve 30c upwardly, as viewed, to a close position, as illustrated, in which the hollow of the sleeve 30c is closed by needle 30b thus dividing the bore into two chambers 30e and 30d. The chamber 30d communicates with the atmosphere via the conduit means 28, the port 17j, the chamber 17, the conduit means 18 and the silencer 19. The chamber 30e communicates with the chamber 17c via the conduit means 29 and the port 17k.

The increase of the opening of the hollow, and corresponding increase of effective flow sectional area between the chambers 30d and 30e, can be controlled by an engine accelerator 36.

A wire cable 32 has its one end attached to the sleeve 30c by a pin 30g and its other end linked to one arm of a bell crank lever 34 rotatably mounted to a pivot shaft 33. The bell crank lever 34 has its other arm linked to a push rod 35 of the accelerator 36. When the accelerator 36 is released, as illustrated by the solid line, the sleeve 30c is in the illustrated position to close communication between the chambers 30d and 30e. When the accelerator 36 is depressed, the sleeve 30c is moved downwardly, as viewed, against the bias action of the valve spring 30g to open communication between the chambers 30d and 30e.

The accelerator actuated valve 30 is so designed that the effective flow sectional area between the chambers 30d and 30e increases as the depression of the accelerator 36 increases.

Vehicle Speed Responsive Valve

The vehicle speed responsive valve 31 is connected to the port 17j by the conduit means 28 and to the port 17k by the conduit means 29 bypassing the accelerator actuated valve 30.

The vehicle speed responsive valve 31 has a flow restricting orifice 31a providing restricted flow communication between a chamber 31b, which communicates with the atmosphere via the conduit means 28, the port 17j, the chamber 17a, the conduit means 18 and the silencer 19, and a chamber 31c, which communicates with the chamber 17c via the conduit means 29 and the port 17k.

A solenoid 31e is installed with its actuating plunger 31d disposed in the chamber 31b. The plunger 31d has its free end portion formed with a valve adapted to close the orifice 31a. When the solenoid 31e is energized, the plunger 31d is in the illustrated position to close the orifice 31a thereby blocking fluid communication between the chambers 31b and 31c. When the solenoid is not energized, the plunger 31d moves downwardly, as viewed, to open the orifice 31a, thereby providing restricted flow communication between the chambers 31b and 31c.

Electrical Control Arrangement

The solenoid 21e for the clutch release valve 21 is electrically connected in series with a normally open switch 40b of a relay 40, an ignition switch (IG) of the engine, a fuse (F) and a battery 41. The relay 40 has a relay coil 40a which, when energized, causes the normally open switch 40b to be closed.

The relay coil 40a is electrically connected in series with a micro switch 39, which in cooperation with a cam member 38 constitutes an acceleration switch, and a shift switch 42.

Acceleration Switch

The micro switch 39 is actuated by the cam member 38 operatively linked with the accelerator 36 so that when the accelerator is released (the illustrated position by the solid line), the cam member closes the micro switch, but when the accelerator is depressed, the cam member opens the micro switch.

The cam member 38 is therefore designed such that as long as the accelerator is between the fully depressed position (the illustrated position by the imaginary line and defined by a stopper 37) and a position (not shown) slightly depressed from the released position (the illustrated position by the solid line) of the accelerator 36, the cam member 38 keeps the micro switch opened, but when the accelerator 36 is between the position slightly depressed from the released position and the released position, the cam member 38 closes the micro switch 39.

Shift Switch

The shift switch 42 is incorporated in a shift knob 9a which is mounted on the gear shift lever 9 for limited movement around a hinge pin 43 from a position of rest. A rigid contact 42a projects from the gear shift lever 9 into the shift knob 9a and is grounded. A pair of contacts 42b are arranged within the shift knob 9a and around the rigid contact 42a such that when the shift knob 9a is manipulated to move the gear shift lever 9 toward a shift position with a load greater than a predetermined value, such as 2kg, the shift knob 9a moves from the position of rest, around the hinge pin 43, to cause one of the pair of contacts 42b to come into contact with the rigid contact 42a. One of the pair of contacts 42b and the rigid contact 42a form a switch, while the other contact 42b and the rigid contact 42a form another switch. These two switches are electrically connected in parallel with each other and the both switches are connected in series with the micro switch 39.

Actuator Switch

The solenoid 17h for the air-on valve 17 is electrically connected in series with the actuator switch 44, the ignition switch (IG), the fuse (F) and the battery 41.

The actuator switch 44 is mounted securely on the clutch actuator 11 through threaded engagement with a nut fixedly secured to the shell 11a. The actuator switch 44 has its actuating plunger 44a projecting into the chamber 11d and axially aligned with the actuator rod 11e. The actuator switch 44 is constructed such that pressing the actuating plunger 44a to the right, as viewed, will close the switch 44.

The amount of protrusion of the actuating plunger 44a is selected such that when the actuator rod 11e moves to the right, as viewed, and approaches the dead position of its stroke upon disengaging the clutch, the head of the actuator rod 11e will begin to press the actuating plunger 44a to close the switch 44. Preferably, the amount of protrusion of the actuating plunger 44a is selected such that it is kept pressed to close the switch 44 until the clutch begins to or is about to engage after the reeengagement of the clutch has commenced.

Vehicle Speed Responsive Switch

Electrically connected in parallel with the micro switch 39, i.e., the accelerating switch, is a normally closed switch 47c of a relay 47. The relay 47 has another normally closed switch 47a which is electrically connected in series with the solenoid 31e of the vehicle speed responsive valve 31, and a relay coil 47b which when energized, opens both of the switches 47a and 47c.

The relay coil 47b is electrically connected in series with the vehicle speed responsive switch 46 via an amplifier 48. The vehicle speed responsive switch 46 is constructed and arranged such that when the vehicle speed, which may be represented by revolution per unit time of the gear box output shaft, is lower than a predetermined value, such as 10km/h, the switch 46 is open, while when the vehicle speed is higher than the predetermined value of 10km/h, it is closed to supply current to the relay coil 47b to cause the relay coil 47b to open the switches 47a and 47c.

The vehicle transmission will operate as follows:

Disengagement of the Clutch

When the vehicle is at a standstill and the engine operates, the vehicle speed responsive switch 46 is open to cause the switches 47a and 47c of the relay 47 to be closed and the engine ignition switch (IG) is closed. Under this condition, when the shift knob 9a is manipulated to close the shift switch 42, current is supplied to the relay coil 40a of the relay 40 to close the switch 40b. Closing of the switch 40b will permit current to be supplied to the solenoid 21e for the clutch release valve 21.

When the vehicle is in motion, the vehicle speed responsive switch 46 is closed to cause the switches 47a and 47c to be opened. Under this condition, closing of the switch 40b of the relay 40 is effected when the shift knob 9a is manipulated to close the shift switch 42 and the accelerator 36 must be released to close the microswitch 39.

Disengagement of the clutch commences as soon as the switch 40b of the relay has been closed. The solenoid 21e then urges the clutch release valve member 21c, against the action of the valve spring 21d, away from the valve seat toward a position to close the connecting passage 27, and connects the chamber 11d of the clutch actuator 11 to the vacuum tank 26. The chamber 11d is connected to the vacuum tank 26, via the conduit means 20, the output chamber 21a, the input chamber 21b and the conduit means 22. Vacuum develops rapidly in the chamber 11d and thus atmospheric pressure in the chambe 11c forces the diaphragm 11b and the actuator rod 11e to the right, as viewed. This rightward movement of the actuator rod 11e, via the adjusting rod 14, the withdrawal lever 7 and the clutch release bearing 8, disengages the clutch. Then gears can be shifted in the normal manner.

Reengagement of the Clutch

The reengagement of the clutch when the vehicle is in motion commences as soon as the shift knob 9a is released to open the shift switch and/or the accelerator 36 is depressed to open the micro-switch 39. This cuts the flow of current to the relay coil 40a to open the switch 40b. Opening of the switch 40b will cut the flow of current to the solenoid 21e. The solenoid 21e then allows the clutch release valve member 21c to seat on the valve seat (see the illustrated position) to disconnect the chamber 11d of the clutch actuator 11 from the vacuum tank 26 and to open the connecting passage 27.

The reengagement of the clutch when the vehicle is at a standstill will not commence as long as the shift knob 9a is manipulated to close the shift switch 42 irrespective of whether or not the accelerator 36 is depressed. This is because the switch 47c, electrically connected in parallel to the micro-switch 39, is closed in this condition.

The reduction of the vacuum in the chamber 11d of the clutch actuator 11 takes place in two stages as soon as the flow of current to the solenoid 21e is cut upon opening of the switch 40b of the relay 40.

First Stage Vacuum Reduction

In the first stage, the vacuum in the chamber 11d of the clutch actuator 11 is reduced very quickly by means of the air-on valve 17 until the clutch begins to engage or is about to engage because the clutch actuator 11e keeps the actuating plunger 44a depressed to close the actuator switch 44 during this period. Closing of the switch 44 will permit current to be supplied to the solenoid 17h for the air-on valve 17. The solenoid 17h then urges the air-on valve member 17b, against the action of the valve spring 17d, upwardly, as viewed to provide unrestricted flow communication between the chambers 17a and 17c.

In this stage, therefore, an atmosphere air is bled to the chamber 11d of the clutch actuator, via the silencer 19, the conduit means 18, the chamber 17a, the chamber 17c, the connecting passage 27, the output chamber 21a and the conduit means 20, without any flow restricting and thus the clutch spring 6 forces the release bearing 8 to the right, as viewed. This rightward movement of the release bearing 8, via the withdrawal lever 7 and the adjusting rod 14, moves the actuator rod 11c and the diaphragm 11b leftwardly (as viewed) rapidly until the clutch begins to engage or is about to engage.

This rapid leftward movement of the actuator rod 11e terminates as soon as the actuator switch 44 is opened to cut the flow of current supplied to the solenoid 17h.

Second Stage Vacuum Reduction

The first stage vacuum reduction terminates as soon as the flow of current supplied to the solenoid 17h is cut and thus the solenoid 17h allows the air-on valve member 17b to close unrestricted flow communication between the chambers 17a and 17c.

In the second stage the residual vacuum in the chamber 11d of the clutch actuator is dissipated gradually by means of the accelerator actuated valve 30 and the vehicle speed responsive valve 31. There are three possible take-up characteristics of the second stage depending on operating conditions of the vehicle, which are:

The second stage when the vehicle is in motion immediately follows the first stage because when the vehicle is in motion the vehicle speed responsive switch 46 is closed to cause the switch 47a to open to cut the flow of current supplied to the solenoid 31e and thus the solenoid 31e opens the flow restricting orifice 31a.

If, under this operating condition of the vehicle, the accelerator 36 remains released after the gear shift has been completed, the residual vacuum in the chamber 11d of the clutch actuator 11 is dissipated gradually via the orifice 31e only so that, after a predetermined time, the clutch is fully engaged. Therefore, the clutch can be smoothly engaged when engine brake is to be effected.

The reduction of the vacuum in the second stage when the vehicle is motion can be speeded up in response to depression degree of the accelerator 36 because as the accelerator 36 is depressed the sleeve 30c is moved away

What is claimed is:

1. In an automobile having an accelerator (36); a gear shift lever (19) and a friction clutch having a driving element (3), a driven element (4) and yieldable means (6) for forcing said elements into contact with each other to effect an engagement of the clutch, a clutch control system comprising:

a clutch actuator means (11) for operating said clutch including a pressure differential operated motor having a power element (11e) operably connected to one of said elements of said clutch and a vacuum chamber (11d);

a source of vacuum (26);

a clutch control valve assembly including a control chamber (17c), a clutch release valve means (21) for establishing an air flow communication between said vacuum chamber and said source of vacuum when a solenoid thereof (21e) is energized and for establishing an air flow communication between said vacuum chamber and said control chamber when said solenoid thereof is not energized, and an air-on valve means (17) for establishing an unrestricted air flow communication between said control chamber and the ambient atmosphere when a solenoid thereof (17h) is energized;

said clutch control valve assembly further including an accelerator actuated valve means (30) for establishing a restricted air flow communication between said control chamber and the ambient atmosphere, said accelerator actuated valve means opening an effective flow area thereof in response to depression degree of said accelerator above a predetermined level; and a control circuit means for energizing said solenoids of said clutch control valve assembly, said control circuit means including a relay (40) including a relay coil (40a) and a normally open relay switch connected in series with said solenoid (21e) of said clutch release valve means (21), said normally open relay switch being closed upon energization of said relay coil;

a throttle position responsive switch means (39) connected in series with said relay coil, said throttle responsive switch means being closed when a throttle valve opening is smaller than a predetermined level and being open when the throttle valve opening is larger than the predetermined level thereof;

a shift switch (42) connected in series with said throttle position responsive switch means, said shift switch being closed upon manipulation of said gear shift lever;

a vehicle speed responsive switch (47c) connected in series with said throttle position responsive switch means, said vehicle speed responsive switch being closed when the vehicle speed is lower than a predetermined level and being open when the vehicle speed is higher than the predetermined level thereof; and an actuator condition responsive switch (44) connected in series with said solenoid (17h) of said air-on valve (17), said actuator condition responsive switch being normally open and closed when said elements (3,4) of said clutch are disengaged from each other.

2. A clutch control system as claimed in claim 1, in which said clutch control valve assembly further includes:

a vehicle speed responsive valve means (31) for establishing a second restricted air flow communication between said control chamber and the ambient atmosphere when a solenoid thereof is energized, said solenoid (31e) of said vehicle speed responsive valve means being connected in series with said vehicle speed responsive switch.

* * * * *